Figure 3:
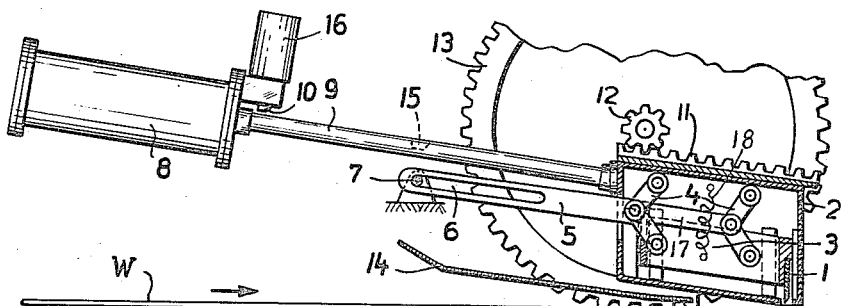
Figure 3:
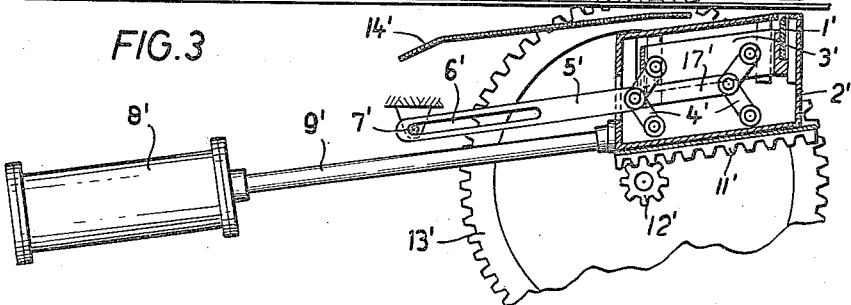

March 4, 1958 N. BOSTRÖM 2,825,402
FLYING SHEARS FOR CUTTING OF CONTINUOUSLY
MOVING ROLLED MATERIAL
Filed Oct. 4, 1955 2 Sheets-Sheet 1
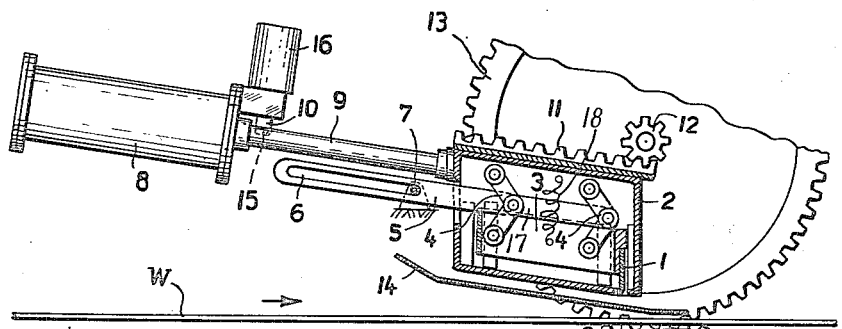
FIG.1
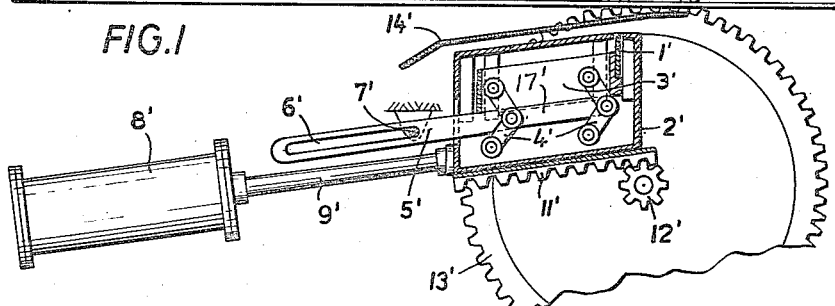
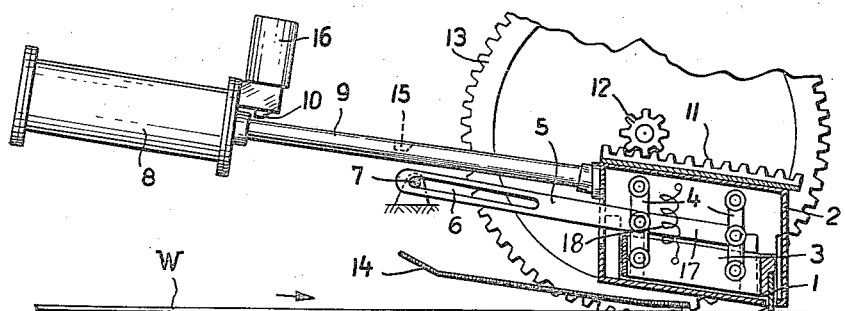
FIG.2
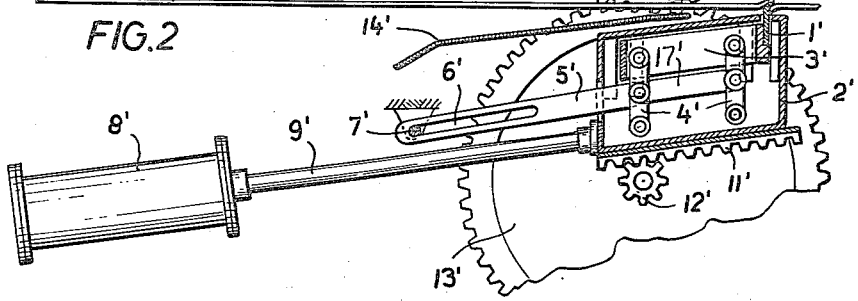
INVENTOR.
Nikolaus Boström
BY
ATTYS.

INVENTOR.
Nikolaus Boström

2,825,402

FLYING SHEARS FOR CUTTING OF CONTINUOUSLY MOVING ROLLED MATERIAL

Nikolaus Boström, Leverkusen-Schlebusch, Germany, assignor to Theodor Wuppermann G. m. b. H., Leverkusen-Schlebusch, Germany Application October 4, 1955, Serial No. 538,487

Claims priority, application Germany October 8, 1954

14 Claims. (Cl. 164—34)

This invention relates to shears for the cutting of continuously moving rolled material, preferably at high rolling speeds, and more particularly to shears known in the art as "flying shears."

Flying shears for the cutting of continuously moving rolled material are well known in the prior art. In the usual structure blades at both sides of the rolled material are moved towards each other, or the upper knife is moved towards the fixed lower knife. For movement of the blades there may be provided an oscillating drive, such as crank gears, eccentrics or the like, or the blades may be activated by means of cam plates. In another known construction the blades may be arranged on rotating rolls or cylinders.

At relatively low rolling speeds it is not too difficult to start the driving engine of the shears, usually an electric motor. This does, however, require engines or motors of high starting power and high capacity with resultant high purchase costs.

In cutting material which moves at high speed, the flying shears must move with a hammer-like motion. In the prior art embodiments, this is usually accomplished by suddenly applying to the knife shaft the kinetic energy of a constantly rotating motor, the cutting speed being adjusted by controlling the speed of the motor. The high speeds which are quite usual in modern steel strip mills impose design requirements which must be met by very heavy gears and high capacity motors. This capacity is necessary for obtaining the required accelerations, although much smaller forces are sufficient for the cutting pressure. These large acceleration forces are used only during the split second between two successive cuttings while the motor runs idle without doing any other useful work than to keep up the gear.

The prior art structures described are very uneconomical as regards their initial purchase and their operating costs. Oscillating shears or cutting devices for flying cutting based upon similar principles cannot be used at high rolling speeds because of the difficulty of handling the accelerations and velocities of the various moving parts.

It is an object of this invention to provide flying shears which will operate at all presently occurring rolling speeds, and likewise at speeds which may be obtained in the future.

Still another object of the invention is to provide flying shears which are low in first cost, which have maximum efficiency in the utilization of applied power and which are economical to operate.

Another object of the invention is to provide a cutting blades which have a hammer-like stroke that is applied in the direction of movement of the material to be cut.

A further object of the invention is to provide flying shears which are operated by fluid pressure applied to reciprocating pistons, the fluid being supplied equally to the operating pistons from a single, high capacity presssure source, and the stroke velocity being substantially constant.

Another object of the invention is to provide a cutting stroke which may be easily adjusted to the speed of the moving strip, and which is instantaneous and rapid, with the cutting time being reduced to as low as 0.02 second.

Still another object of the invention is to provide means for positive synchronism of the cutting blades.

Another object is to provide flying shears wherein the compressor need only be of such capacity as to replace the air used for movement of the working pistons, the time interval between cuttings providing time for such replenishment.

A final object of the invention is to provide a simple structure which is easy to maintain and service.

Other objects and advantages of the invention will become apparent during the course of the following description.

Figure 4:
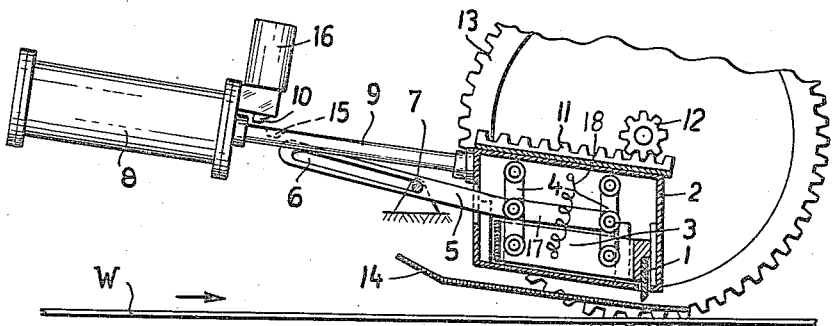
Figure 4:
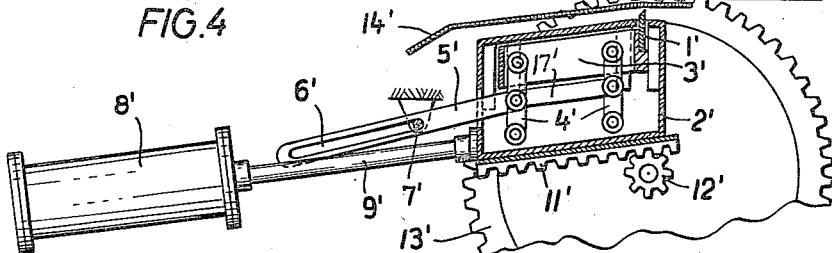

In the drawings like reference characters indicate like parts in the several views and, Fig. 1 is a side elevational view, partly in section, showing the position of the cutting shears at the initial part of a cutting cycle, Fig. 2 is a side elevational view, partly in section, showing the shears at the instant the cut is made, Fig. 3 is a side elevational view, partly in section, showing the position of the parts at the end of forward movement, Fig. 4 is a side elevational view, partly in section, illustrating the position during backward movement immediately before the stop engages the piston rod of the working cylinder.

It is pointed out that in the structure of the invention the units above and below the work are identical, except for the stop means, and a description of the upper unit is to be understood to apply also to the lower unit, the corresponding parts in the lower unit being designated by similar but primed reference numerals.

The shear blade 1 is carried by a blade slide 3 which is supported by toggle levers 4 and positioned for vertical sliding movement within a movable frame 2. The toggle levers 4 with the interconnecting link 17 are operated by means of a pivotally connected draw bar 5 which has an elongated slot 6 formed therein. A bolt 7 positioned transversely of the slot 6 serves as an abutment. The blade frame 2 is supported by a piston rod 9 which reciprocates in a cylinder 8, the path of travel of the frame being inclined towards the frame of the work W. The inclined path of the frames 2 and 2' insures that the knives 1 and 1' are converging one towards the other when moved into shearing position.

A fluid pressure is maintained in the cylinder 8 by connecting the same with a storage tank (not illustrated) of large volume, so that there will be available during operation a large volume of air or gas.

A gear rack 11 fixed to the frame 2 meshes with and drives a pinion 12, which is secured to the large gear wheel 13. The gear wheel 13 positively engages the gear wheel 13'. This effects positive synchronism of the blade frames 2 and 2', and consequently positive synchronism of the cutting blades 1 and 1'.

For holding the flying shears in non-operating position a notch 15 is provided in the piston rod 9 and a stop 10 projects downwardly into the notch 15. The stop 10 is reciprocated by any desired electrical or mechanical means 16.

The cylinder 8 is provided with any desired and well known control valves which are not illustrated and do not form any part of the present invention. The guides 14 and 14' serve as a throat between which the work W is directed, and serve to protect the work.

The operation of the device is as follows:

To start operation of the shears, stop 10 is released from the notch 15. The pistons 8 and 8' drive the frames 2 and 2' with high velocity in the direction of movement of the rapidly travelling work W, the inclined paths of the frames 2 and 2' causing them to converge one towards the other. At the beginning of this movement, the toggle levers 4 remain in the position as shown in Fig. 1, the knife being held in retracted position in the blade slide 3, and the draw bar 5 moving freely as the slot 6 moves over the bolt 7. As the frames 2 and 2' approach the end of their travel, the bolts 7 and 7' suddenly strike the ends of the slots 6 and 6'. The toggle levers 4 and 4' are suddenly drawn into alignment, as shown in Fig. 2, and the blades 1 and 1' are suddenly and with great force thrown into shearing action. The cutting force because of the toggle levers 4 is great compared with the operating force applied to the draw bars 5 and 5'.

As the frames 2 and 2' reach the end of their stroke, as shown in Fig. 3, the toggle levers 4 and 4' collapse and the shear blades 1 and 1' are suddenly retracted from the moving band.

The pistons 8 and 8' are then actuated to slowly retract the frames 2 and 2'. The slotted draw bars 5 and 5' ride freely over the bolts 7 and 7' and the blades 1 and 1' remain in retracted position during the initial movement because of friction, and in the case of the lower blade 1', and also because of the gravity of the blade assembly. If the friction in the upper blade slide 3 is insufficient to counteract the force of gravity on the upper assembly so as to hold the blade 1 retracted until operated by bolt 7 striking the end of slot 6, a retaining spring 18 may be used as shown for suspending the blade slide assembly from the frame 2. The frames 2 and 2' because of their inclined paths draw away from the work and over the guides 14 and 14'. As the bolts 7 and 7' reach the end of the slots 6 and 6', the toggle levers 4 and 4' again straighten and momentarily project the blades 1 and 1'. This is shown in Fig. 4. However, the frames 2 and 2' have now been moved away from the work and blades 1 and 1' during this part of the cycle do not contact the work W. Further retractive movement collapses the toggle levers 4 and 4' in a forward direction and the shears again reach the position shown in Fig. 1, in condition for the beginning of a new cycle.

While the embodiment of the invention shown herein illustrates the use of a fluid operated piston for reciprocation of the frames 2 and 2', it is to be understood that other sources of energy may be used such as tensioned spring, electromagnetic coils or solenoids, electric motors or the like. It would be possible, for example, to use as driving power an instantaneously electromagnetic field whereby the relative velocity between shear blades and the moving material may be brought into strict conformity.

What is claimed is:

1. In flying shears for cutting a continuous strip of material which is advancing at a high rolling speed, wherein shearing blades are positioned on opposite sides of said continuous strip and moved toward each other for coacting shearing action, a blade supporting frame adjacent each of the two opposed faces of said strip, said frames being in opposed relation, means for reversely moving the frames in the general direction of movement of the strip material, each of said frames having a shearing blade slidably mounted therein for movement transversely of said strip, toggle levers connecting said blades to said frames, and means connected to said toggle levers to suddenly extend said levers and provide a synchronized hammer-like projection of said blades towards each other for shearing engagement of the work moving therebetween including a rod connected to the toggle levers and extending outwardly of the frame and means with which the rod is engageable for limiting movements of the frame and rod.

2. In flying shears for cutting a continuous strip of material which is advancing at a high rolling speed, wherein shearing blades are positioned on opposite sides of said continuous strip and moved toward each other for coacting shearing action, a blade supporting frame adjacent each of the two opposed faces of said strip, said frames being in opposed relation and movable in inclined paths toward said strip so as to converge upon each other, each of said frames having a shearing blade slidably mounted therein for movement transversely of said strip, means for moving said frames, in their inclined paths, and means operatively associated with each of said blades for causing a synchronized hammer-like projection of said blades toward each other for shearing engagement of the work moving therebetween.

3. In flying shears for cutting a continuous strip of material which is advancing at a high rolling speed, wherein shearing blades are positioned on opposite sides of said continuous strip and moved toward each other for coacting shearing action, a blade supporting frame adjacent each of the two opposed faces of said strip, said frames being in opposed relation and movable in inclined paths toward said strip so as to converge upon each other, each of said frames having a shearing blade slidably mounted therein for movement transversely of said strip, means for moving said frames in their inclined paths, toggle levers connecting said blades to said frames, and means connected to said toggle levers to suddenly extend said levers and provide a synchronized hammer-like projecting of said blades toward each other for shearing engagement of the work moving therebetween.

4. In flying shears for cutting a continuous strip of material which is advancing at a high rolling speed, wherein shearing blades are positioned on opposite sides of said continuous strip and moved toward each other for coacting shearing action, a blade supporting frame adjacent each of the two opposed faces of said strip, said frames being in opposed relation and movable in inclined paths toward said strip so as to converge upon each other, each of said frames having a shearing blade slidably mounted therein for movement transversely of said strip, means for moving said frames in their inclined paths, fixed stop means positioned adjacent said frames, and means attached to said blades and positioned to be operated by said stop means as the frames approach the inner limits of their inclined travel paths to cause a synchronized hammer-like projection of the blades toward each other for shearing engagement of the work moving therebetween.

5. In flying shears for cutting a continuous strip of material which is advancing at a high rolling speed wherein shearing blades are positioned on opposite sides of said continuous strip and moved toward each other for coacting shearing action, a blade supporting frame adjacent each of the two opposed faces of said strip, said frames being in opposed relation and movable in inclined paths toward said strip so as to converge upon each other, each of said frames having a shearing blade slidably mounted therein for movement transversely of said strip, means for moving said frames in their inclined paths, fixed stop means positioned adjacent said frames, toggle levers connecting said blades to said frames, and means connected to said toggle levers and positioned to be engaged by said stop means as the frames approach the inner limits of their inclined travel paths to cause a synchronized, hammer-like projection of the blades toward each other for shearing engagement of the work moving therebetween.

6. Flying shears as set forth in claim 2 wherein each of said frames has a gear rack secured thereto for movement with said frame and a relatively large gear wheel journaled for rotation adjacent said frame and driven by said rack, the teeth of said large gear wheels being in engagement, whereby positive means is provided for moving said frames and said shearing blades in synchronism.

7. Flying shears as set forth in claim 3 wherein each of said frames has a gear rack secured thereto for movement with said frame and a relatively large gear wheel journaled for rotation adjacent said frame and driven by said rack, the teeth of said large gear wheels being in engagement whereby positive means is provided for moving said frames and said shearing blades in synchronism.

8. Flying shears as set forth in claim 4 wherein each of said frames has a gear rack secured thereto for movement with said frame and a relatively large gear wheel journaled for rotation adjacent said frame and driven by said rack, the teeth of said large gear wheels being in engagement whereby positive means is provided for moving said frames and said shearing blades in synchronism.

9. Flying shears as set forth in claim 5 wherein each of said frames has a gear rack secured thereto for movement with said frame and a relatively large gear wheel journaled for rotation adjacent said frame and driven by said rack, the teeth of said large gear wheels being in engagement whereby positive means is provided for moving said frames and said shearing blades in synchronism.

10. In flying shears for cutting a continuous strip of material which is advancing at a high rolling speed, wherein shearing blades are positioned on opposite sides of said continuous strip and moved toward each other for coacting shearing action; a blade supporting frame adjacent each of the two opposed faces of said strip, said frames being in opposed relation and movable in inclined paths toward said strip so as to converge upon each other; means for reciprocating said frames in their inclined travel paths; each of said frames having a shearing blade slidably mounted therein for movement transversely of said strip, toggle levers connecting said frame and said blade, and a rod connecting the center pivots of said toggle levers and extending outwardly of said frame, said rod extension having an elongated slot formed therein; and a fixed stop pin positioned in each of said slots.

11. Flying shears as set forth in claim 10 wherein the slot is of such length that the stop pin will engage the outer end thereof just before the frames reach the inner limits of their inclined travel paths to cause a sudden, hammer-like projection of said blades by the extension of said toggle levers and a sudden retraction thereof as said toggle levers then collapse, and wherein the stop pin will engage the inner end of said slot to return the toggle levers to operating position only as the frames approach the outer limits of their travel paths.

12. Flying shears as set forth in claim 10 wherein each of said frames has a gear rack secured thereto for movement with said frame and a relatively large gear wheel journaled for rotation adjacent said frame and driven by said rack, the teeth of said large gear wheels being in engagement thereby providing positive means for moving said frames and said shearing blades in synchronism.

13. Flying shears as set forth in claim 10 wherein the means for moving said frames in their inclined travel paths comprises a cylinder and fluid operated piston.

14. Flying shears as set forth in claim 10 wherein the means for moving said frames in their inclined travel paths comprises a cylinder and fluid operated piston, and stop means for holding said piston in retracted position.

References Cited in the file of this patent

UNITED STATES PATENTS

| | | |
|---|---|---|
| 377,500 | Sagendorph et al. | Feb. 7, 1888 |
| 557,018 | Philipp | Mar. 24, 1896 |
| 897,344 | Bray et al. | Sept. 1, 1908 |
| 947,724 | Wood | Jan. 25, 1910 |
| 1,417,117 | Tyler | May 23, 1922 |
| 1,684,617 | Biggert | Sept. 18, 1928 |
| 1,716,991 | Turner | June 11, 1929 |
| 1,844,660 | Kastel | Feb. 9, 1932 |

FOREIGN PATENTS

| | | |
|---|---|---|
| 307,915 | Germany | Mar. 28, 1919 |